United States Patent Office 2,851,393
Patented Sept. 9, 1958

2,851,393

β-DIETHYLAMINO BUTYRIC ACID ANILIDE, NON-TOXIC SALTS THEREOF AND AQUEOUS LOCAL ANESTHETIC SOLUTIONS THEREWITH

Emil Hofstetter, Grunegg, Wolhusen, Switzerland, assignor to Ed. Geistlich Söhne A. G. für Chemische Industrie, Wolhusen, Switzerland, a Swiss body corporate No Drawing. Application December 27, 1955
Serial No. 555,305

Claims priority, application Switzerland May 13, 1952

6 Claims. (Cl. 167—52)

This invention relates to certain new anaesthetic compounds, and processes for the preparation thereof, which compounds possess a useful pharmacological activity, being particularly valuable local anaesthetics, especially for nerve block anaesthesia.

These new compounds have the general formula

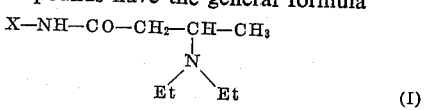

where X is selected from the group consisting of phenyl and monoalkoxyphenyl groups, said alkoxy substituents having from 1 to 5 carbon atoms.

It is of course known that certain compounds within the class of amino acyl anilides possess local anaesthetic properties, and for example α-diethylamino acetyl 2,6-xylidide is at the present time a well-known and widely-used local anaesthetic, under the name of "Xylocaine."

The compounds of Formula I above are distinguished from all prior anaesthetic compounds known to the applicant by the feature that the alkylamino substituent occupies the β-position in the side-chain whilst the carbon side-chain extends beyond the β-position, so that the alkylamino substituent can be regarded as a branched rather than a terminal group.

I have found that the compounds of Formula I above and their non-toxic water- and alcohol- soluble salts display an unexpected and highly useful prolongation and/or enhancement of activity together with a reduced toxicity and/or tendency to give rise to side-effects such as tissue irritation, and furthermore a generally superior vasoconstrictor effect in the absence of other vaso-constrictors such for example as adrenaline, when compared with local anaesthetics known hitherto. It will of course be understood that the new compounds will not necessarily be superior to the known anaesthetics in respect of each one of their individual properties, but that they are superior on balance of all their properties.

According to this invention therefore there are provided new anaesthetic compounds having the general formula:

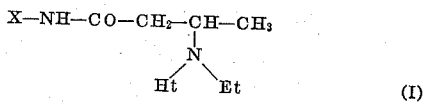

where X is selected from the group consisting of phenyl and monoalkoxyphenyl groups having from 1 to 5 carbon atoms in the alkoxy substituents, and their non-toxic water- and alcohol-soluble salts.

Where X is a monoalkoxyphenyl group, the preferred group of compounds are those in which the monoalkoxy substituents in the ring are in the ortho- or para-positions.

Of the new compounds, that in which X is an unsubstituted phenyl group is of particular value and is outstanding among all the compounds of this invention by reason of its particularly prolonged anaesthetic activity and its low toxicity.

According to a preferred feature of the invention therefore there is provided, as a new compound of anaesthetic activity, β-diethylamino butyric acid anilide, having the following structural formula:

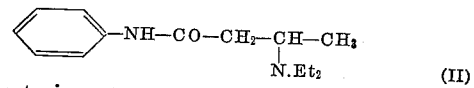

and its non-toxic water- and alcoholic-soluble salts.

By the term "non-toxic" as applied to the salts of the new compounds of this invention is meant such salts as are not substantially more toxic under normal conditions of administration than the new compounds themselves. Such non-toxic salts specifically include the citrates, tartrates, acetates, sulphates and particularly the hydrochlorides of the new compounds.

The new compounds of general Formula I above, and most especially that of Formula II above, have been shown in laboratory tests on animals to be in general more effective than Xylocaine when the therapeutic ratio of their activities in relation to their acute toxicities is considered, and to give a greater duration of anaesthesia. Clinical testing has shown that the compound of formula II above is a safe and effective local anaesthetic of greater duration than known anaesthetics, for example Xylocaine, which—due inter alia to its only very slight tendency to cause irritation of the mucous membrane, and its prolonged activity—is of considerable utility in for example dental surgery, bronchoscopy and similar surgical interventions in the region of the ear, nose, mouth and throat.

Certain of the new compounds according to the invention are now tabulated below, giving in each case the results obtained in vivo for their infiltration anaesthetic activity, their surface anaesthetic activity, their acute toxicity ($LD_{50}$) for adult white mice, and an indication of the irritation caused to the tissue on administration. Similar results obtained for Xylocaine are also given for the purpose of comparison:

TABLE I

| Compound of formula I, where— | | Results obtained | | | |
|---|---|---|---|---|---|
| No. | X is— | Infiltration effect | Surface effect | Toxicity $LD_{50}$ in mg./kg. (mouse) | Tissue Irritation |
| 1 | Phenyl | ++/+++ | + | ++ i. v.<br>++ s. c. | 0 |
| 2 | p-methoxy phenyl | ++ | — | + i. p.<br>+ i. v. | — |
| 3 | p-ethoxy phenyl | ++/+++ | + | + i. v. | 0 |
| 4 | p-(n)-butoxy phenyl | +++ | — | +++ s. c.<br>++ i. v. | 0 |
| 5 | o-methoxy phenyl | ++ | — | ++ i. v. | — |
| "Xylocaine" | | ++/+++ | — | +++ i. v.<br>+++ s. c.<br>+++ i. p. | 0 |

In the above table, — indicates that the result is not known, + means less than, ++ means about equal to, and +++ means more than procaine, a known anaesthetic of rather different structure which was chosen as a standard for comparison; while in the results obtained for the toxicities of the new compounds, "i. v." indicates that the test was carried out by intravenous injections, "s. c." indicates that it was by subcutaneous injection, and "i. p." refers to intraperitoneal injection. In all cases solutions of between 0.2%–2% of the compound tested were employed. In the last column of the table "0" shows that no irritation was observed.

In order further to demonstrate the advantage possessed by the new compounds of Formula I above, and especially of that of Formula II, when the therapeutic ratio of activity to toxicity is considered, quantitative results obtained for the acute toxicities of an illustrative pair of the new compounds are given below in comparison with similar results obtained in respect of procaine and "Xylocaine":

TABLE II

| Compound | $LD_{50}$ (mg./kg.-Mice determined by injection) | | |
|---|---|---|---|
| | "s. c." | "i. v." | "i. p." |
| procaine | 500–520 | 93 | 188 |
| "Xylocaine" | 390 | 20–33 | 160 |
| No. 1 in Table I | 500–520 | 60–100 | 240 |
| No. 3 in Table I | 320–420 | 100–120 | |

The above results show that, in terms of the therapeutic ratio of anaesthetic activity to acute toxicity, the new compounds of Formula I above are all generally equivalent to and most cases slightly better than Xylocaine, immediately after injection. The surprising and highly advantageous property possessed by all these compounds to a greater or lesser degree, and especially by the compound of Formula II above, and which property particularly distinguishes them over and above known local anaesthetics such as Xylocaine, is the markedly increased duration of the anaesthesia induced, generally accompanied by a most useful vaso-constrictor effect. This increased duration of all these compounds has been demonstrated in the laboratory, and confirmed by simple experiments in man. Further animal tests in the laboratory, for example a slightly modified form of the Moukhtar test for infiltration anaesthetic effect, have shown the compound of Formula II above (compound No. 1 in Table I) to be outstandingly better than either Xylocaine or procaine in this respect.

Full scale clinical testing of the compound of Formula II above has shown that it is of outstanding utility as a long-lasting local anaesthetic which does not give rise to depression in the patient after the anaesthetic effect has worn off, and which has the further unexpected advantage that it has itself a vaso-constrictor effect which allows other vaso-constrictors, such as adrenaline, to be dispensed with under all but exceptional circumstances.

The compound of Formula II above and its non-toxic water- and alcohol-soluble salts is for the purposes of administration as an anaesthetic normally formulated in the form of sterile injectable solutions in an inert pharmaceutical carrier or diluent, especially in water.

Accordingly it is specific preferred feature of the invention to provide local anaesthetic compositions in the form of sterile injectable solutions of the compound of Formula II above, or its non-toxic salts, either alone or in admixture with other anaesthetics or adjuncts thereof, in an inert pharmaceutical carrier or diluent.

It has been found that for most purposes in for example dental surgery, local anaesthesia over the area which is usually necessary, of the required depth, and of highly satisfactory duration, can be induced by the subcutaneous injection of between 1 and 3 ccs. of an approximately 2% aqueous solution of the compound of Formula II above or its non-toxic water- or alcohol-soluble salts, the preferred dose being approximately 2 ccs. of an aqueous 2% solution of the hydrochloride of the new compound.

Accordingly it is a further specific preferred feature of the invention to provide local anaesthetic compositions in dosage unit form adapted for use in dental surgery containing from 1 to 3 ccs. of a 2% aqueous solution or suspension of the compound of Formula II above or its non-toxic water- or alcohol-soluble salts, and preferably a dosage unit containing approximately 2 ccs. of an aqueous 2% solution of β-diethyl-amino butyric acid anilide hydrochloride.

For minor surgery satisfactory local anaesthesia can usually be induced by injection of from 1 to 5 ccs. of a 1 to 2% solution of the new compound of Formula II, and accordingly yet another feature of this invention is to provide local anaesthetic compositions in dosage unit form adapted for use in minor surgery containing from 1 to 5 ccs. of a 1 to 2% aqueous solution or suspension of the compound of Formula II or its non-toxic water- or alcohol-soluble salts.

For major surgical interventions the new compound of Formula II, or its non-toxic salts, finds application as a ganglionic blocking agent which may be parenterally administered as and where necessary, provided that not more than 80 ccs. of a 2% solution is used. With lesser concentrations larger doses can be administered, and for example with a 1% solution up to 140 ccs. can be given, or up to 220 ccs. using a 0.5% solution.

It has been found possible by administering such doses of the compound of Formula II or its non-toxic water- or alcohol- soluble salts by subcutaneous injection, substantially to relieve or prevent pain in the locality of the injection, with little or no substantial side-effects, for prolonged periods during dental extractions or other minor surgical interventions in the human body.

The compounds of general Formula I above may be prepared in a number of ways. It has for example been found possible to prepare the new anesthetic compounds by reacting a compound of general formula:

$$X-NH-CO-CH=CH-CH_3 \quad (III)$$

where X has the previously stated meaning, with diethylamine.

The reaction proceeds according to the equation:

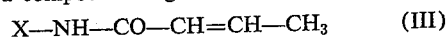
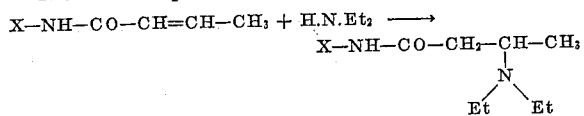

The reaction takes place with or without pressure at between 90° and 200° C., preferably at a temperature in the range of from 100°–150° C. It is preferably effected under pressure however, for example by heating the reaction mixture for several hours in a closed vessel at a temperature between 100° C–150° C. The reaction can with advantage be effected in the presence of inert solvents, for example organic solvents such as alcohol.

The new compounds may be conveniently separated from any unchanged starting material in the reaction mixture by extracting the latter with dilute acids, such as sulphuric, acetic, citric, tartaric and preferably hydrochloric acids to yield salts of the new compounds which are easily soluble in the dilute acids used for the extraction, whereas any of the unchanged starting materials are soluble therein either not at all or only with great difficulty.

It has been shown that, contrary to expectation, it is not possible to obtain the new compounds of Formula I above by direct reaction between diethylamine and a β-halogenated saturated acyl anilide; therefore if it should be wished to use such a β-halogenated saturated acyl anilide as starting material this must first be converted into the $\Delta^{1,2}$-unsaturated acyl anilide, by splitting off HCl, before this latter compound is reacted with diethylamine as above described.

An unexpected alternative method of producing the new compounds of general Formula I above has also been found to be possible. It has now been discovered that it is possible under certain selected conditions to produce β-alkylamino acyl anilides or monoalkoxyanilides by reduction of the corresponding β-alkylimino compounds. The production of β-imino butyric acid anilide, or its tautomer β-amino crotonic acid anilide, by the reaction of acetoacetic acid anilide with amines has been described in Ber. d. dtsch. chem. Ges., 27 (1892), 771, and in Annalen der Chemie, 439 (1924), 213. It is however clear from these publications that the product of this reaction may be decomposed extremely readily, and thus for example upon boiling in aqueous solution or merely upon solution of the hydrochloride in water at room temperature the reaction product is rapidly and quantitatively reconverted into the corresponding amine and acetoacetic acid anilide. In these circumstances it is extremely surprising that it is possible to reduce compounds of this class to the corresponding alkylamino compounds in satisfactory yield. Previous attempts to carry out such a reduction have indeed led to very poor yields. It has however now been found that this reduction can in fact be carried out in relatively good yield by the use of certain selected reducing agents, namely by the use of a metal amalgam reducing agent, preferably aluminium amalgam.

The reaction is illustrated by the following equation, wherein the tautomeric form of the structure is employed:

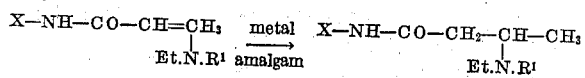

(IV)

where X has the previously stated meaning, and $R^1$ is either hydrogen or an ethyl group.

The reaction is advantageously carried out in an organic, preferably alcoholic, solvent, the preferred solvent being methanol. The temperature should be as low as possible, preferably room temperature. The reaction takes some time to reach completion, during which time the reaction mixture should preferably be continuously stirred or shaken to ensure thorough mixing. On completion, the reduction product which is in the solvent layer may be separated, freed from the solvent for example by evaporation in vacuo, and further worked up as necessary.

Where $R^1$ is hydrogen, that is where the reduction product is the β-monoethylamino analogue of the compounds of Formula I above, it may be converted into the corresponding compound of Formula I by ethylation in any convenient way. One convenient method involves reaction with an ethyl halide Et-Hal., for example by refluxing with ethyl bromide in alcoholic solution for a prolonged period. The new compounds can then be isolated from the reaction product in good yield and further worked up in a manner similar to that already described.

In order that the invention may be fully understood some detailed examples of its various aspects will now be given, by way of illustration only:

Example 1

29 parts of crotonic acid anilide and 70 parts of diethylamine are heated together in a closed vessel for 18 hours at 120–130° C. Then the excess of diethylamine is distilled off, and the mixture is diluted with water and acidified with hydrochloric acid. The insoluble material is separated and the solution made alkaline. The thus precipitated semi-solid compound is dissolved in ether. After drying the ether is distilled off and the residue crystallised from petroleum ether.

The resultant β-diethylamino butyric acid anilide melts at 45–46° C. It is easily soluble in the calculated amount of hydrochloric acid. It is also easily soluble in ether, alcohol and benzene and may be recrystallised from petroleum ether.

Example 2

10 parts of crotonic acid p-phenetidide and 25 parts of diethylamine are heated together for 20 hours in a closed vessel at 130–140° C. The mixture is then worked up as described in Example 1. The residue does not solidify, and is dissolved in dry ether and admixed with dry alcoholic or gaseous hydrochloric acid. The hydrochloride is precipitated and is recrystallised from much benzene or acetic ester.

The resultant β-diethylamino butyric acid p-phenetidide hydrochloride melts at 178° C. It is very easily soluble in alcohol and water.

Example 3

8.5 parts of crotonic acid p-anisidide and 35 parts of diethylamine are heated together for 20 hours at 130–135° C. in a closed vessel.

The excess of diethylamine is then distilled off, and the residue treated with dilute hydrochloric acid. The insoluble unchanged starting material is separated, and the solution made alkaline. The precipitated oily compound is taken up in ether, dried and freed from ether.

The residue does not solidify, and is taken up in anhydrous ether and mixed with absolute alcoholic or gaseous hydrochloric acid. The hydrochloride is precipitated and is recrystallised from ethyl acetate.

The resultant β-diethylamino butyric acid p-anisidide hydrochloride melts at 160–161° C. It is very easily soluble in alcohol and water, and very difficultly soluble in benzene and ether.

Example 4

6 parts of crotonic acid (p-butoxy)-anilide and 35 parts of diethylamine are heated together in a closed vessel for 20 hours at a temperature of 130–140° C. The mixture is worked up as in Example 3.

The resultant β-diethylamino butyric acid (p-(n)-butoxy)-anilide hydrochloride melts at 156–157° C. It is very easily soluble in water and alcohol, and difficultly soluble or insoluble in most other organic solvents.

Example 5

6 parts of crotonic acid o-anisidide and 30 parts of diethylamine are heated together for 18 hours in a closed vessel, at a temperature of 125–135° C. The resulting mixture is worked up in the same manner as previously described for the p-alkoxy derivatives.

The resultant β-diethylamino butyric acid o-anisidide hydrochloride melts at 170–171° C. It is easily soluble in water and alcohol, and difficultly soluble to insoluble in ether and benzene.

Example 6

16 parts of crotonic acid o-phenetidide and 50 parts of diethylamine are heated together for 24 hours in a closed vessel, at 135–145° C. The resulting mixture is worked up as previously described for the p-alkoxy derivatives.

The resultant β-diethylamino butyric acid o-phenetidide hydrochloride melts at 169–170° C. It is easily soluble in water and alcohol.

Example 7

50 gms. of β-ethylamino crotonic acid anilide were dissolved in 450 ccs. of methanol, and to the solution were added 40 gms. of aluminium amalgam prepared as described below. The mixture was stirred for 35 hours at room temperature. The methanolic solution was separated, filtered, and the methanol evaporated off in vacuo to give a viscous oil, β-ethylamino butyric acid anilide. Yield 40 gms. (70.9% of theory).

The aluminium amalgam used above was freshly prepared from aluminium turnings washed twice with N/10 NaOH, once with water, twice with a 1% solution of $HgCl_2$ and once more with water.

The β-monoethylamino butyric acid anilide thus produced may be converted into the anaesthetic compound β-diethylamino butyric acid anilide as follows:

70 gms. of β-ethylamino butyric acid anilide were dissolved in 40 gms. of ethyl bromide and 10 mls. of alcohol, and refluxed for 72 hours. The reaction product was then dissolved in excess 2 N hydrochloric acid, filtered and made alkaline. The precipitate was taken up in ether and thoroughly dried. Through the dried ethereal solution is passed dry hydrochloric acid gas, whereupon pure β-diethylamino butyric acid anilide hydrochloride is precipitated. M. P. 132–134° C. This is easily soluble in water, and may if desired easily be reconverted into the free compound.

This application is a continuation-in-part of my prior co-pending application for Letters Patent of the United States, Serial No. 354,428, filed May 11, 1953, now abandoned.

I claim:

1. A compound selected from the group consisting of β-diethylamino butyric acid anilide and non-toxic salts thereof, said salts being soluble in at least one solvent selected from the group consisting of water and alcohol.

2. β-Diethylamino butyric acid anilide hydrochloride.

3. A local anaesthetic composition comprising a sterile injectable solution of a substance selected from the group consisting of β-diethylamino butyric acid anilide and non-toxic salts thereof.

4. A local anaesthetic composition in dosage unit form adapted for parenteral administration in dental surgery each dosage unit comprising from 1 to 3 ccs. of an approximately 2% aqueous solution of a compound selected from the group consisting of β-diethylamino butyric acid anilide and non-toxic salts thereof.

5. A local anaesthetic composition in dosage unit form adapted for parenteral administration each dosage unit comprising approximately 2 ccs. of an aqueous 2% solution of β-diethylamino butyric acid anilide hydrochloride.

6. A local anaesthetic composition in dosage unit form adapted for parenteral administration in minor surgery each dosage unit comprising from 1 to 5 ccs. of a 1–2% aqueous solution of a compound selected from the group consisting of β-diethylamino butyric acid anilide and non-toxic salts thereof.

References Cited in the file of this patent

UNITED STATES PATENTS

| | | |
|---|---|---|
| 2,441,498 | Lofgren et al. | May 11, 1948 |
| 2,576,106 | Cusic | Nov. 27, 1951 |
| 2,801,247 | Smith et al. | July 30, 1957 |

OTHER REFERENCES

Modern Drug Encyclopedia, 5th ed., 1952, Drug Pub. Inc., New York, N. Y., pp. 790–791.

Hofstetter: Nature, vol. 170, Dec. 6, 1952, p. 980.